(12) United States Patent
Bucknell

(10) Patent No.: US 8,353,648 B2
(45) Date of Patent: Jan. 15, 2013

(54) LOAD-BEARING RING FOR HYDRAULIC FASTENERS

(75) Inventor: John Wentworth Bucknell, Indooroopilly (AU)

(73) Assignee: John Wentworth Bucknell (AU)

( * ) Notice: Subject to any disclaimer, the term of this patent is extended or adjusted under 35 U.S.C. 154(b) by 0 days.

(21) Appl. No.: 11/576,713

(22) PCT Filed: Oct. 5, 2005

(86) PCT No.: PCT/AU2005/001527
§ 371 (c)(1),
(2), (4) Date: Sep. 12, 2007

(87) PCT Pub. No.: WO2006/037173
PCT Pub. Date: Apr. 13, 2006

(65) Prior Publication Data
US 2008/0267732 A1  Oct. 30, 2008

(30) Foreign Application Priority Data
Oct. 5, 2004  (AU) ................................ 2004905707

(51) Int. Cl.
*F16B 31/00* (2006.01)
(52) U.S. Cl. ........ 411/14.5; 411/432; 411/434; 411/917
(58) Field of Classification Search ............... 411/14, 411/14.5, 432, 434, 917
See application file for complete search history.

(56) References Cited

U.S. PATENT DOCUMENTS

| | | | | |
|---|---|---|---|---|
| 482,935 A * | 9/1892 | Willcoxon | ..................... | 411/248 |
| 670,235 A * | 3/1901 | Irlbacher | ..................... | 241/286 |
| 1,024,344 A * | 4/1912 | Langevin | ..................... | 403/370 |
| 1,217,804 A * | 2/1917 | Dymock | ..................... | 285/388 |
| 1,821,976 A * | 9/1931 | Holland-Letz | ............... | 384/493 |
| 1,861,846 A * | 6/1932 | Dymock | ..................... | 411/432 |
| 2,420,921 A * | 5/1947 | Waldes | ..................... | 411/519 |
| 2,476,586 A * | 7/1949 | Darash | ..................... | 411/519 |
| 2,813,732 A * | 11/1957 | Hird | ..................... | 403/377 |
| 2,989,888 A * | 6/1961 | Brock | ..................... | 411/548 |
| 3,162,084 A * | 12/1964 | Wurzel | ..................... | 411/519 |
| 3,367,228 A * | 2/1968 | King, Jr. | ..................... | 411/361 |
| 4,019,824 A * | 4/1977 | Percy | ..................... | 403/261 |
| 4,501,521 A * | 2/1985 | Geczy | ..................... | 411/217 |
| 4,687,399 A * | 8/1987 | Petrie | ..................... | 411/518 |

(Continued)

FOREIGN PATENT DOCUMENTS
GB        2214589 A      9/1989

(Continued)

*Primary Examiner* — Roberta Delisle
(74) *Attorney, Agent, or Firm* — Krugliak, Wilkins, Griffiths & Dougherty Co., L.P.A.; David P. Dureska; Brent L. Moore

(57) ABSTRACT

Load-bearing ring (120, 220) have segments (121, 122, 221, 222) connected by studs (123) or frangible portions (228), where opposed tapered faces (125, 126, 225, 226) co-operate with complementary faces (114, 115) on hydraulic fasteners (110, 210) on a tapered face (342) on a washer (341), to enable controlled release of the load-bearing rings (110, 210) to enable de-tensioning of a bolt or stud tensioned by the hydraulic fasteners (110, 210, 310).

6 Claims, 5 Drawing Sheets

U.S. PATENT DOCUMENTS

| | | | | |
|---|---|---|---|---|
| 4,702,657 A | * | 10/1987 | Jelinek | 411/369 |
| 4,892,432 A | * | 1/1990 | Cooper | 403/297 |
| 5,114,289 A | * | 5/1992 | Coiffman | 411/13 |
| 5,188,494 A | * | 2/1993 | Hatin | 411/10 |
| 5,653,481 A | * | 8/1997 | Alderman | 285/363 |
| 5,700,122 A | * | 12/1997 | Korpi | 411/551 |
| 6,821,207 B2 | * | 11/2004 | Bommarito et al. | 464/130 |
| 6,966,735 B1 | * | 11/2005 | Yamazaki | 411/149 |
| 7,090,061 B2 | * | 8/2006 | Bove et al. | 192/70.2 |
| 7,198,465 B1 | * | 4/2007 | Ichiryu | 415/214.1 |
| 7,261,506 B2 | * | 8/2007 | Smolarek | 411/161 |

FOREIGN PATENT DOCUMENTS

| | | |
|---|---|---|
| WO | 95/33931 A1 | 12/1995 |
| WO | 00/51791 A1 | 9/2000 |
| WO | 03/047811 A1 | 6/2003 |

* cited by examiner

Area Of Thread Engagement = 1555.3 mm²

Area Of Thread Engagement = 547.3 mm²

Area Of Thread Engagement = 172 mm²

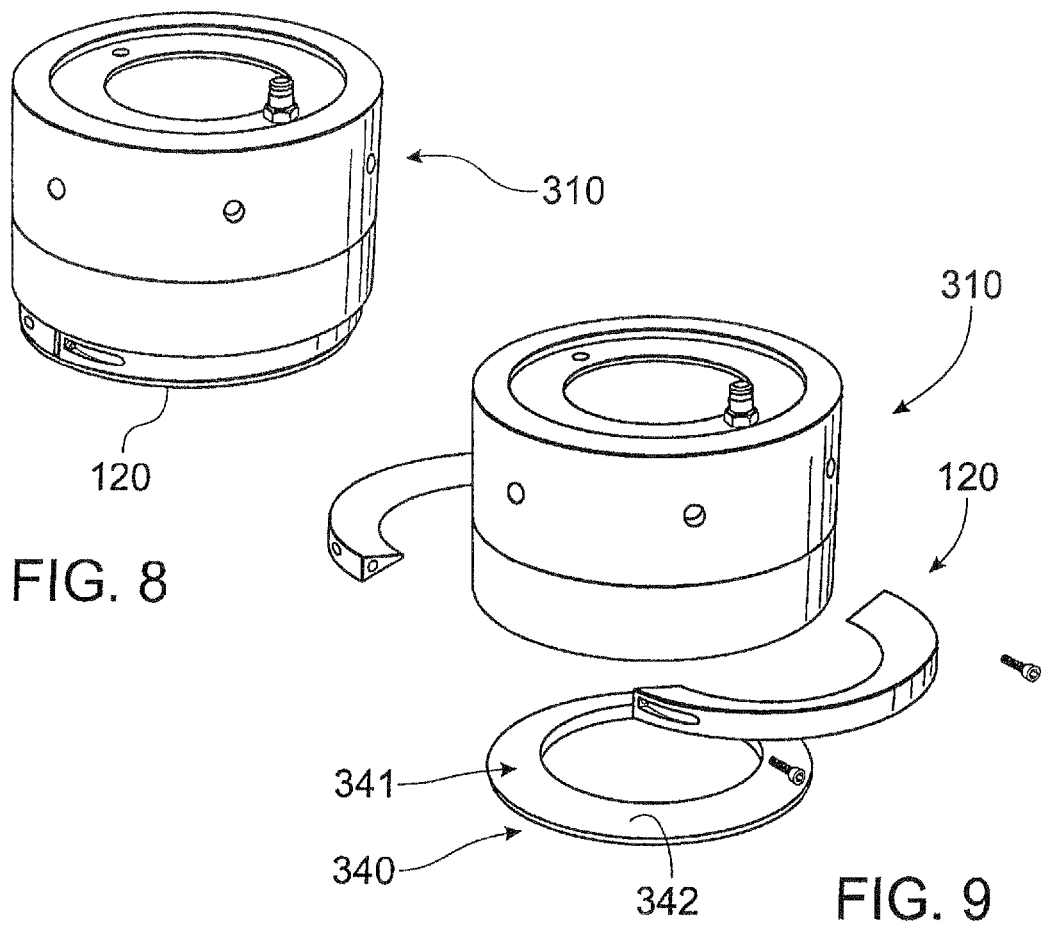
FIG. 8
FIG. 9
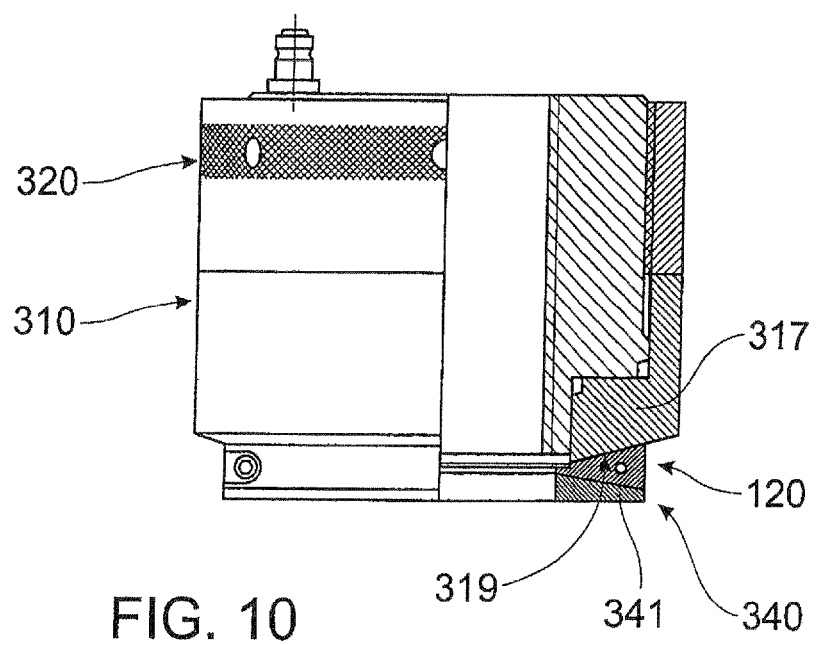
FIG. 10

LOAD-BEARING RING FOR HYDRAULIC FASTENERS

CROSS-REFERENCE TO RELATED APPLICATIONS

This application claims the benefit of PCI Application Serial No. PCT/AU2005/001527 filed Oct. 5, 2005, which claims the benefit of Australian Patent Application Serial No 2004905707, filed Oct. 5, 2004.

BACKGROUND OF THE INVENTION

1. Field of the Invention

THIS INVENTION relates to load-bearing rings for hydraulic fasteners and hydraulic tensioning devices, and other tensioning devices.

The hydraulic fasteners and hydraulic tensioning devices are operable to fasten one or more parts together. The hydraulic fasteners may comprise an hydraulic nut or washer; while the hydraulic tensioning devices may comprise tensioning rings particularly suitable for, but not limited to, closing flange joints on pipe lines, valves and the like.

2. Prior Art

The use of fasteners employing hydraulic operating components to apply bolt tension is well-established. Examples can be found in U.S. Pat. No. 5,730,569 (Bucknell) (=International Application PCT/AU93/00477=International Publication WO 94/07042). Further examples can be found in the "References Cited" on U.S. Pat. No. 5,730,569.

Such fasteners are intended to be installed in a manner allowing the periodic removal of the service or maintenance on the equipment to which they are fixed. Such fasteners are seldom used in situations where they may be permanently applied.

Tension release systems have preferred use in a closed system incorporating a tensile member applying a clamping force to fasten the assembly, for example, simple bolt and nut systems of such applications as the bolting of flanges or other mechanical components.

Tensile members such as bolts and shafts and such arrangements apply clamping forces to subject components as a result of their being elongated by known bolt-tightening methods and consequently seeking to return to their free length. It is a known practice that in situations where the capacity to de-tension the member, by the reversal of the method of application, may be diminished or impractical to place a sacrificial component, such as a washer, into the assembly. In such circumstances, the washer may be removed by force, or by cutting it with an oxy-acetylene torch in order to allow the tensile member to return to its free length, thus releasing the applied tensile force.

In the practice of applying tensile force by the application of a hydraulic fastener of the type hereinbefore described, should its internal seals fail, then the unit may become impossible to remove by usual means.

Previously used methods require that the locking ring which maintains the tensile load through the components of the hydraulic fastener be split into two or more pieces and removed from engagement to permit the bolt to regain its free length and relax the clamping force. It is possible to form a locking ring with a permanent bifurcation and securing method so that this operation can be performed more easily. It is, however, unavoidable that some damage will occur to the threads of engagement between the locking ring and its mating hydraulic fastener component. As hereinafter illustrated in the prior art example of FIGS. 1 and 2(a) to (c), as the semi-circular locking ring portion disengages from the hydraulic fastener body, then the force acting is progressively concentrated upon the remaining engaged portion of those threads, with consequential damage from overloading unavoidable.

SUMMARY OF THE PRESENT INVENTION

It is an object of the present invention to provide a method of avoiding the damage, hereinbefore described, to threaded components, by the insertion of a divisable load-bearing ring which may be removed to release the clamping force in the system.

It is a preferred object of the present invention to provide such a load-bearing ring where the faces of engagement with abutting components are angled to effect a tapered construction to aid removal of the ring as necessary.

It is a further preferred object of the present invention to provide such a ring which incorporates an alignment lip to assist in locating the load-bearing ring before the bolt or fastener is tensioned and the locking ring secured in place.

It is a further preferred object to provide such a locking ring which may either be re-usable or sacrificial (i.e., used once only).

Other preferred objects of the present invention will become apparent from the following description.

In one aspect, the present invention resides in a load-bearing ring having at least two segments, where the opposed faces of the ring, for engagement with complementary faces of abutting components, are angled to effect a tapered construction in sectional end view.

Preferably, under load, the opposed faces will provide a force vector to assist the externally-applied effort.

Preferably, the load-bearing ring is located in place actually by an alignment lip which locates the segments relative to the components.

In a re-usable load-bearing ring, the segments are prevented from bursting outwards by respective securing screws which releasably connect adjacent segments together.

In an alternative embodiment, where the load-bearing ring is a once-only use or sacrificial ring, the adjacent segments may be interconnected by predetermined, weakened or frangible portions which are broken when the segments are driven out of position to release the load.

Preferably, the angle of taper between the opposed faces is chosen as the best to retain the locking ring in place due to sticking friction between the abutting faces of the load-bearing ring and the components, whilst rendering the load-bearing ring easy to remove.

The load-bearing ring may have three or more segments, as required to best advantage, depending on the needs of the individual application. In some embodiments, separate self-contained "collapsible washers" may incorporate the locking ring as hereinbefore described.

BRIEF DESCRIPTION OF THE DRAWINGS

To enable the invention to be fully understood, preferred embodiments will now be described with reference to the accompanying drawings in which:

FIGS. 8 and 9 are schematic views showing a hydraulic fastener fitted with a washer assembly incorporating the load-bearing ring of the present invention; and FIG. 10 is a side, part-sectional view, corresponding to FIG. 8.

DETAILED DESCRIPTION OF THE PREFERRED EMBODIMENT

Figures 2A, 2B, 2C:
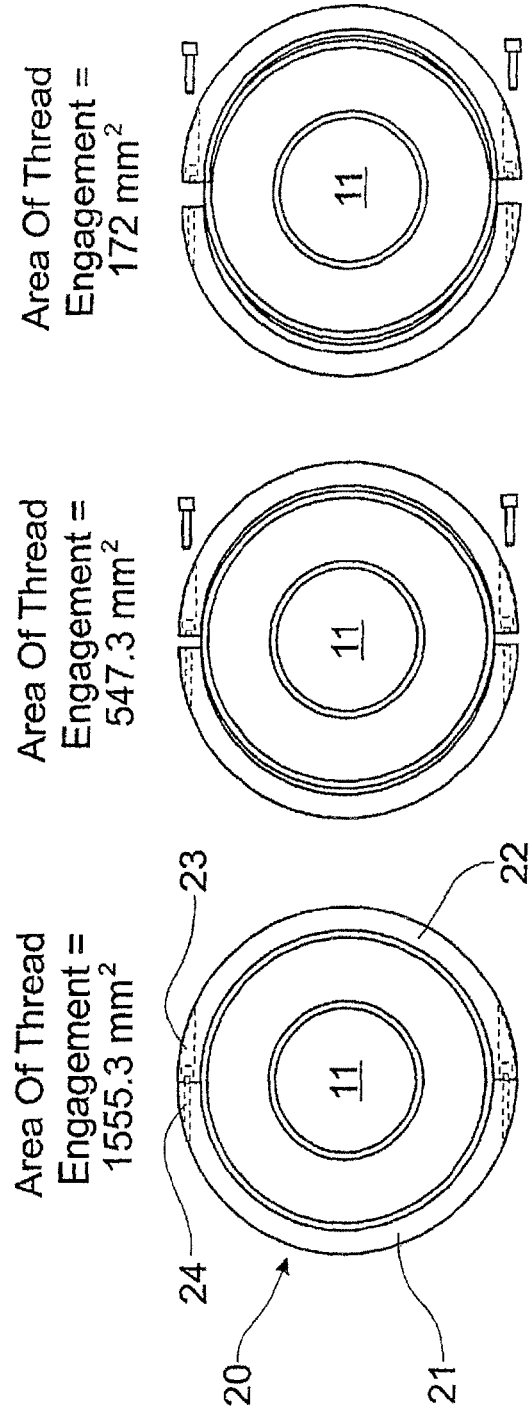
FIGS. 2(a) to (c) illustrate the change in area of thread engagement as the locking ring of the prior art is released.
Figure 1:
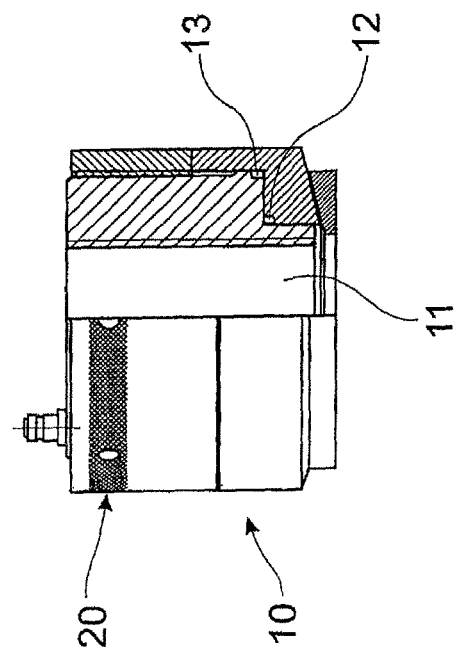
FIG. 1 is a schematic side view of a hydraulic fastener fitted with a locking ring of the prior art.

Referring to FIGS. 1 and 2(a) to (c), a hydraulic fastener 10 is adapted to tension a bolt or shaft not shown which passes through bore 11. When the bolt or shaft is fully tensioned, locking ring 20 is installed to prevent the release of tension on the bolt or shaft 11 should the hydraulic seals 12, 13 in the hydraulic fastener 10 fail.

As shown in FIGS. 2(a) to (c), the locking ring 20 has a pair of segments 21, 22 which are secured together by bolts or studs 23 screw-threadably engaged in bores 24 in the segment 21.

When the locking ring is to be removed, the studs 23 are rotated to be progressively unscrewed from the threaded bores 24. As shown in a usual example, as the bolts 23 are progressively released, the area of thread engagement drops markedly and so the compressive forces applied to the locking ring are transmitted to an ever-decreasing area of threaded engagement between the bolts 23 and the bolts 24.

When the bolts 23 have been released, the segments 21, 22 are separated to allow release from the hydraulic fastener 20. Again, the tensile force on the bolt is progressively applied to small areas of engagement between the abutting faces of the hydraulic fastener 10 and the locking ring 20 to make the removal of the locking ring segments more difficult.

As the locking ring segments will usually be removed sequentially, there will be a tendency for the hydraulic fastener to distort when only one of the segments is removed and this is liable to result in damage to the thread of the bolt or shaft as it is engages the bore 11 of the hydraulic fastener.

Figure 3:
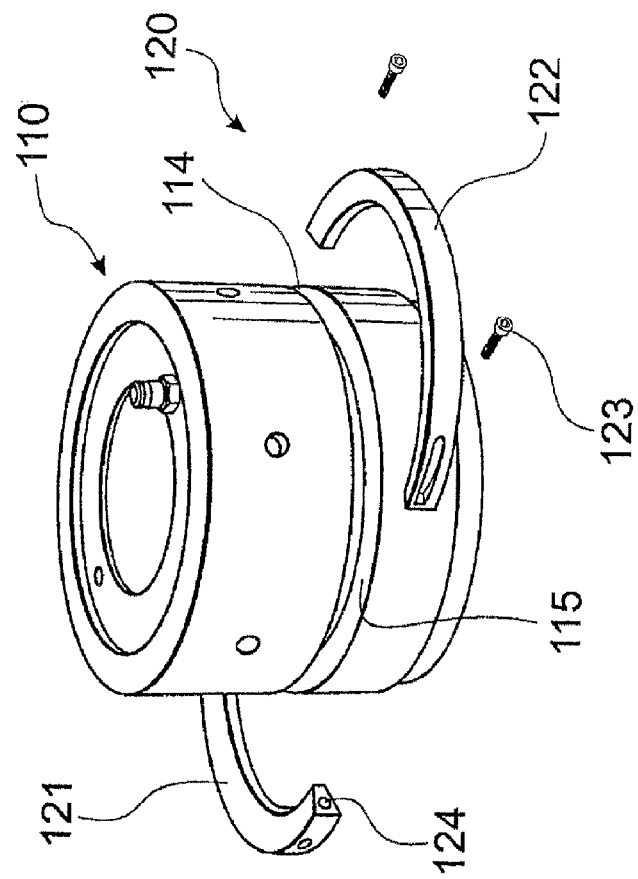
FIGS. 3(a) and (b) show a hydraulic fastener fitted with the re-usable load-bearing ring of the present invention.
Figure 3:
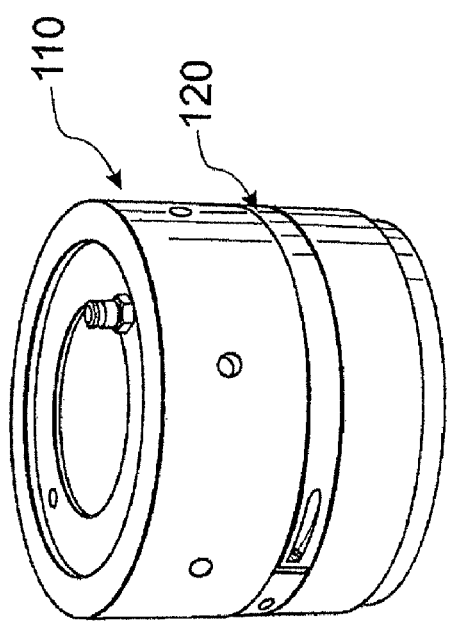

Referring now to FIGS. 3(a) and (b), a reusable load-bearing ring (or split ring) 120 in accordance with a first embodiment of the present invention, is shown in association with a hydraulic fastener 110.

Figure 4:
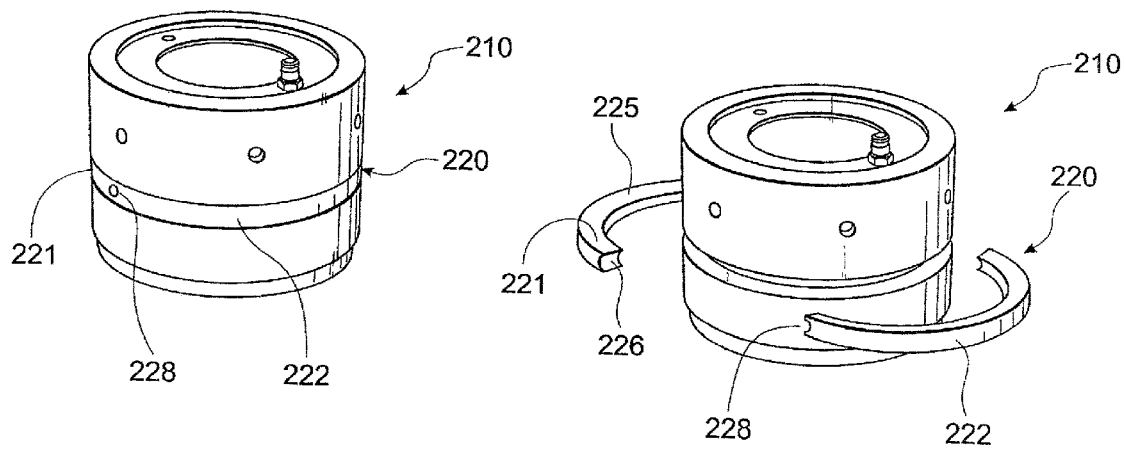
FIGS. 4(a) and (b) show similar views of a sacrificial ring in accordance with the present invention.
Figure 5:
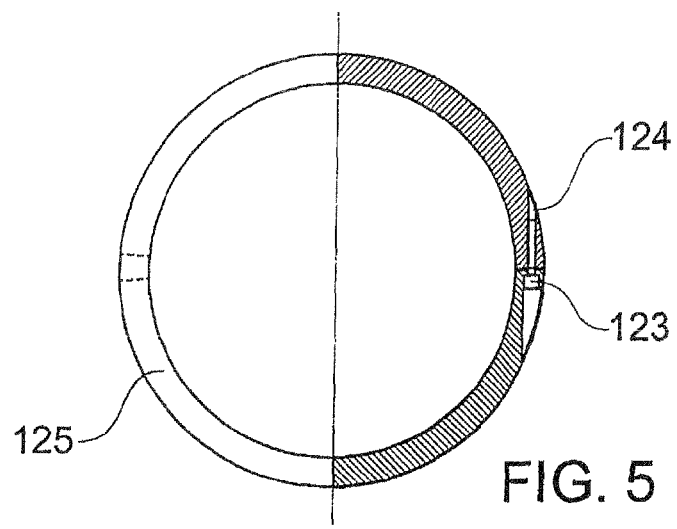
FIG. 5 is a top plan, part-sectional view of the re-usable load-bearing ring in accordance with the present invention.

Similarly, FIGS. 4(a) and (b) show a sacrificial load-bearing ring 220, in accordance with the second embodiment of the present invention, to be used with hydraulic fastener 210.

Referring to FIGS. 3(a) and (b), 5, 6 and 7, the load-bearing ring 120 has a pair of segments 121, 122 which are releasably secured together by bolts 123 engaged in threaded bores 124.

Figure 7:
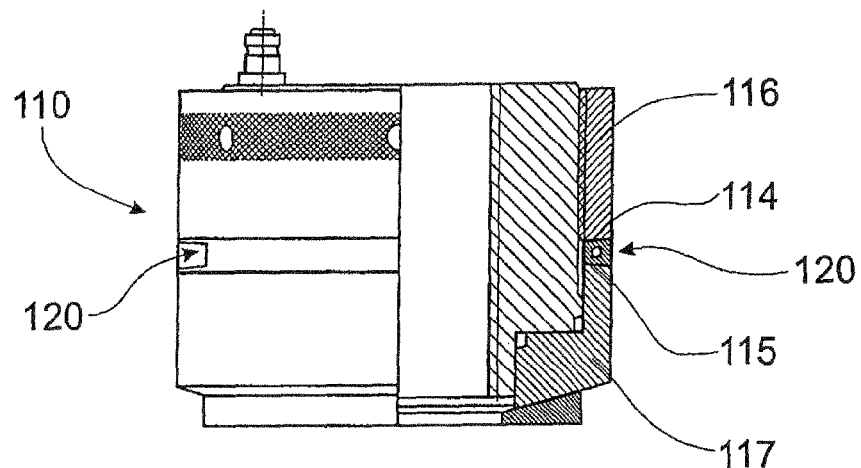
FIG. 7 is a side, part-sectional view showing the load-bearing ring of FIGS. 5 and 6 installed in a hydraulic fastener.
Figure 6:
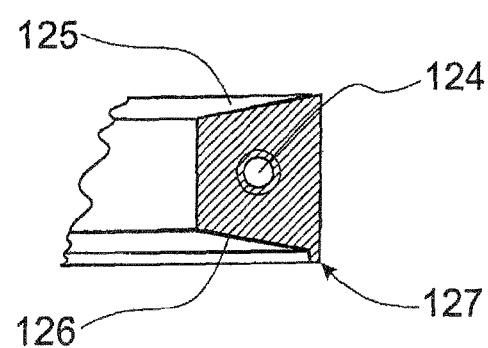
FIG. 6 is a sectional end view of the locking ring of FIG. 5.

However, in contrast to the locking ring 20 of the prior art, and as shown in more detail in FIGS. 6 and 7, the segments 121, 122 have tapered upper and lower faces 125, 126 which are inwardly-convergent at an angle and are engageable by complementary abutment faces 114, 115, on the abutting components 116, 117 of the hydraulic fastener 110. As hereinbefore described, the actual included angle of taper between the faces 125, 126 will be chosen as that which best retains the load-bearing ring 120 in place due to sticking friction between the abutting faces 114, 125 and 115, 126 whilst enabling the segments 121, 122 to be easily removed when the load-bearing ring is being released from the body of the hydraulic fastener 110.

An alignment lip 127 (see FIG. 6) is preferably provided around the periphery of tapered face 126 to assist in alignment of the segments 121, 122 relative to the components 116, 117 of the hydraulic fastener 110 before the hydraulic fastener tensions the bolt or shaft therethrough.

As hereinbefore described, the angle of taper between the faces 125, 126 and the engagement of those faces with faces 114, 115 will aid removal of the load-bearing ring 120.

As an alternative to the reusable split ring 120, FIGS. 4(a) and (b) show a sacrificial load-bearing ring 220 which has segments 221, 222 with the tapered faces 225, 226 substantially as hereinbefore described with the locking ring 120.

In this embodiment, the segments 221, 222 are connected by frangible portions 228 which can be broken by an externally-applied force. For example, a tapered tool may be driven into a tapered hole in the frangible section 228 to release the adjacent ends of the segments 221, 222.

In the embodiments illustrated in FIGS. 3(a) to 7, the load-bearing rings 120, 220 are shown having two segments 121, 122 and 221, 222, respectively, only. It will be readily apparent to the skilled addressee that each load-bearing ring 120, 220 may have three or more segments. The alignment lip 127, as illustrated in FIG. 6 will assist in placement of the segments between the abutting components of the hydraulic fasteners 110, 210.

As illustrated in FIGS. 8, 9 and 10, the load-bearing ring 110 may be incorporated in a washer assembly 340 which also incorporates a washer 341 having a tapered face 342 complementary to the tapered face 126 of the locking ring 110. (The tapered face 125 of the load-bearing ring may engage a tapered or spherical face on component 317 of the hydraulic fastener 310. As illustrated, the hydraulic fastener 310 could also be fitted with a load-bearing ring 320 in accordance with the present invention.)

It will be readily apparent to the skilled addressee that the load-bearing rings 120, 220 and/or washer assembly 340, incorporating a load-bearing ring 120, can enable more controlled release of the load-bearing rings to enable the de-tensioning of the bolt or stud tensioned by the hydraulic fasteners 110, 210, 310.

While the present invention has been described in relation to the use of the load-bearing rings in association with hydraulic fasteners, it will be readily apparent to the skilled addressee that the load-bearing rings may be used with other bolt or stud tensioning devices where the bolts or studs must be de-tensioned to enable the tensioning devices to be removed and/or the fastened components to be separated.

Various changes and modifications may be made to the embodiments described and illustrated without departing from the present invention.

The invention claimed is:

1. A load-bearing ring having at least two segments, where the opposed faces of the ring, for engagement with complementary faces on abutting components, are angled so that each one of said opposed faces includes an inwardly-convergent tapered construction in sectional end view, whereby the opposed faces retain the locking ring in place due to friction between the abutting faces of the load-bearing ring and the components under load, said load being parallel to a longitudinal axis of a shaft on which said ring is fitted, wherein in a once-only use or sacrificial ring, the adjacent segments are interconnected by predetermined, weakened or frangible portions which are broken when the segments are driven out of position in an outward direction to release the load.

2. A load-bearing ring as claimed in claim 1, wherein:
under said load, the opposed faces will provide a force vector perpendicular to said load to assist the externally-applied effort.

3. A load-bearing ring as claimed in claim 1, wherein:
the load-bearing ring is located in place by a peripheral flange portion which locates the segments relative to the components, said peripheral flange portion being located on a periphery of said load-bearing ring.

4. A load-bearing ring as claimed in claim 1, wherein:
in a re-usable load-bearing ring, the segments are prevented from bursting outwards by respective securing screws which releasably connect adjacent segments together.

5. A load-bearing ring as claimed in claim 1, wherein:
the load-bearing ring has three or more segments.

6. The load bearing ring of claim 1 further comprising:
a washer assembly, said washer assembly comprising a washer having an inclined face, said washer inclined face being complimentary to at least one of said faces of said locking ring.

* * * * *